United States Patent
Ruelle

(10) Patent No.: US 12,547,404 B2
(45) Date of Patent: Feb. 10, 2026

(54) STORING A DUPLICATED RETURN ADDRESS AND STACK POINTER IN REGISTERS TO PREVENT OVERFLOW ATTACKS

(71) Applicant: STMicroelectronics International N.V., Geneva (CH)

(72) Inventor: Frederic Ruelle, Marigne-laille (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/614,049

(22) Filed: Mar. 22, 2024

(65) Prior Publication Data
US 2025/0036408 A1 Jan. 30, 2025

(30) Foreign Application Priority Data
Mar. 28, 2023 (FR) ...................... 2302932

(51) Int. Cl.
*G06F 9/30* (2018.01)
(52) U.S. Cl.
CPC ................. *G06F 9/30058* (2013.01)
(58) Field of Classification Search
CPC ............... G06F 9/3005; G06F 9/30054; G06F 9/30058; G06F 9/30101; G06F 9/30021; G06F 9/3863
See application file for complete search history.

(56) References Cited

U.S. PATENT DOCUMENTS

| | | | | |
|---|---|---|---|---|
| 11,468,168 B1 * | 10/2022 | Blasco | ................ | G06F 21/566 |
| 2008/0271142 A1 * | 10/2008 | Murawski | ............ | G06F 21/57 |
| | | | | 726/22 |
| 2015/0067279 A1 * | 3/2015 | Costin | .................. | G06F 12/023 |
| | | | | 711/154 |
| 2016/0381050 A1 * | 12/2016 | Shanbhogue | .......... | G06F 21/52 |
| | | | | 726/23 |
| 2017/0161095 A1 * | 6/2017 | Horsnell | ............... | G06F 12/128 |
| 2018/0004531 A1 * | 1/2018 | Chen | .................... | G06F 3/0631 |
| 2020/0371809 A1 * | 11/2020 | Niu | ....................... | G06F 9/4484 |
| 2021/0011717 A1 * | 1/2021 | Lin | ..................... | G06F 11/0778 |
| 2024/0104024 A1 * | 3/2024 | Ingalls | ............... | G06F 12/1081 |

FOREIGN PATENT DOCUMENTS

WO 2017112232 A1 6/2017

OTHER PUBLICATIONS

INPI Search Report and Written Opinion for priority application, FR Appl. No. 2302932, report dated Nov. 27, 2023, 8 pgs.
Davi, Lucas, et al.: "ROPdefender: A Detection Tool to Defend Against Return—=Oriented Programming Attacks," Mar. 22, 2011, pp. 40-51, XP058002596.

\* cited by examiner

*Primary Examiner* — Jacob Petranek
(74) *Attorney, Agent, or Firm* — Crowe & Dunlevy LLC

(57) ABSTRACT

A computer system is provided including a memory configured to store a computer program product, a processor configured to execute said computer program product, and a memory circuit. The computer program product includes at least one instruction to duplicate in the memory circuit a return address defined upon function call, and at least one instruction to compare a value of the return address stored in a call stack at the value of the return address duplicated in the memory circuit and to permit a function return branching only if these two values are identical.

13 Claims, 2 Drawing Sheets

STORING A DUPLICATED RETURN ADDRESS AND STACK POINTER IN REGISTERS TO PREVENT OVERFLOW ATTACKS

PRIORITY CLAIM

This application claims the priority benefit of French Application for Patent No. 2302932, filed on Mar. 28, 2023, the content of which is hereby incorporated by reference in its entirety to the maximum extent allowable by law.

TECHNICAL FIELD

Embodiments and implementations relate to computer systems, and more particularly the execution of programs on such computer systems.

BACKGROUND

Computer programs comprise instructions which can be executed by a computer.

A computer program comprises functions (also called "subprograms" or "subroutines"). A function is a sequence of instructions used to execute a specific task. For example, the task of a function may include carrying out a given computation, writing a file on a hard disk, or communicating with a peripheral, etc.

In order to use a function, a program is configured to call this function. Calling a function includes executing a branching the destination memory address of which is that of the function. A function terminates in a branching, which enables the computer to return back to the memory address, called return address, corresponding to the address of the instruction which follows the function call branching.

This return address is recorded upon calling the function so as to be recovered to carry out, at the end of the execution of this function, a return of said function to continue the execution of the program. More particularly, the program uses a call stack (also referred to by the expression "execution stack") of the computer at each function call. The call stack allows storing the information required for carrying out the function call: the return address, the arguments/parameters, the backup copy of the registers of the processor, the local variables, etc.

Depending on the executed function, the call stack may be adapted to receive data originating from outside the computer. For example, the call stack may serve in storing data received from a sensor, through a "UART" (acronym for "Universal Asynchronous Receiver Transmitter") communication or a Wi-Fi communication.

An attacker could modify this call stack by injecting data from outside the computer to force the execution of a malware by the computer. In particular, a stack overflow type advanced operating technique ("stack overflow") is known. This technique is referred to by the acronym "ROP" standing for "Return-Oriented Programming". This technique is used by the attacker to obtain a control of the call stack of a program by modifying, in particular, the return address registered in the stack. The attacker uses this modification of the return address to execute a sequence of instructions located in an executable memory area. These instructions are referred to by the expression "gadget". Thus, the attacker could assemble several gadgets so that the computer executes non-programmed operations.

For example, this technique allows the carrying out of a denial-of-service attack because the computer can no longer execute any program properly.

Several known solutions allow protecting against "ROP" attacks in more or less robust manner.

For example, it is possible to duplicate the call stack so as to obtain an additional stack. The additional stack then serves as a reference to verify whether the call stack has not been undesirably modified. The additional stack is registered in a random-access memory ("RAM"). This additional stack has the drawback of occupying a relatively large space in the random-access memory. Thus, the use of such an additional stack could be too expensive, with regard to its occupancy of the random-access memory, for embedded systems, such as microcontrollers. This additional stack also has the drawback of being complex to implement whether by software or by hardware. Furthermore, this additional stack has the drawback of being also modifiable by an attacker.

Hence, there is a need for providing a simple and robust solution against "ROP" type attacks.

SUMMARY

According to one aspect, a computer system—in particular a microcontroller—is provided including a memory configured to store a computer program product, a processor configured to execute the computer program product, and a memory circuit.

The computer program product includes instructions which, when the program is executed by the processor, cause the latter to execute at least one function configured to receive data from outside the computer system.

The instructions include instructions configured to carry out a call and a return of the at least one function, the instructions for calling the at least one function including an instruction configured to store a return address in a call stack, and at least one additional instruction configured to duplicate the return address in the memory circuit.

The return instructions of the at least one function include an instruction configured to carry out a branching from the return address stored in the call stack, and at least one additional instruction configured to compare the value of the return address stored in the call stack to the value of the return address duplicated in the memory circuit, and to allow performing the branching only if these two values are identical.

Such a computer system allows executing a computer program including the additional instructions only for the call and the return of the at least one function configured to receive data originating from outside the computer system.

In particular, the computer program includes additional instructions allowing verification that the value of the return address used to perform the return of the function actually corresponds to the duplicated value in the memory circuit. This allows ensuring that the value of the return address has not been modified upon execution of the function.

If the value of the return address differs from the duplicated value in the memory circuit, then this could mean that the computer system undergoes the beginning of a "ROP" type attack upon execution of the function. In this case, the computer system may implement countermeasures to resist the "ROP" type attack.

Hence, such a program is configured to prevent an attacker from taking control of a link register or of an instruction pointer upon function return.

The memory circuit may include a register configured to store the duplicated return address. Such a memory circuit has the advantage of having a simple and inexpensive structure for storing the duplicated return address. Furthermore, such a register can hardly be modified by an attacker.

In an advantageous embodiment, the computer program includes instructions which allow stopping the execution of the program or performing the return branching according to the duplicated value of the return address if the execution of the at least one function return additional instruction allows detecting that the value of the return address in the call stack is different from the duplicated value of the return address in the memory circuit.

In this manner, the computer program allows undertaking countermeasures when the value of the return address in the call stack is different from the duplicated value of the return address in the memory circuit, in particular when the computer system undergoes the beginning of a "ROP" type attack.

The instructions for calling the at least one function further include at least one additional instruction configured to duplicate a value of a call stack pointer ("stack pointer") defined when the return address is added to the call stack. The return instructions of the at least one function include at least one additional instruction configured to compare the value of the call stack pointer defined upon recovery of the return address of the call stack to carry out the branching to the value of the call stack pointer duplicated in the memory circuit and to allow performing the branching only if these two values are identical.

Thus, the computer program includes additional instructions allowing verifying whether the value of the stack pointer upon recovery of the return address upon return of the function corresponds to the duplicated value in the memory circuit. This allows ensuring that the stack size has not been modified during the execution of the function.

If the value of the pointer upon recovery of the return address differs from the duplicated value in the memory circuit, then this could mean that the computer system has undergone the beginning of a "ROP" type attack. In this case, the computer system may implement countermeasures to resist the "ROP" type attack.

The control of the value of the stack pointer upon function return allows determining whether the address of the memory location of the call stack that contains the return address has been modified during the execution of the function. This allows improving the "ROP" type attack detection.

The memory circuit includes a register configured to store the value of the duplicated stack pointer. Such a memory circuit has the advantage of having a simple and inexpensive structure for storing the duplicated value of the stack pointer. Furthermore, such a register can hardly be modified by an attacker.

In an advantageous embodiment, the computer program includes instructions which allow stopping the execution of the program or performing the return branching according to the duplicated value of the return address if the execution of the at least one function turn additional instruction allows detecting that the value of the stack pointer upon return is different from the duplicated value of the stack pointer.

In this manner, the computer program allows undertaking countermeasures on its own when the value of the stack pointer upon return is different from the duplicated value of the stack pointer, in particular when the computer system experiences the beginning of a "ROP" type attack. Alternatively, the computer program may generate an exception code. Afterwards, this exception code may be detected to implement countermeasures.

According to another aspect, a computer program product is provided including instructions which, when the program is executed by the processor of a computer system as described before, cause the latter to execute at least one function configured to receive data from outside the computer system, the instructions including instructions configured to carry out a call and a return of the at least one function.

The instructions for calling the at least one function include an instruction configured to store a return address in a call stack, and at least one additional instruction configured to duplicate the return address in the memory circuit of the computer system.

The return instructions of the at least one function include an instruction configured to carry out a branching from the return address stored in the call stack, and at least one additional instruction configured to compare the value of the return address stored in the call stack to the value of the return address duplicated in the memory circuit and to allow performing the branching only if these two values are identical.

The at least one additional instruction configured to duplicate the return address is configured to store the duplicated return address in a register of the memory circuit.

In an embodiment, the computer program product further includes instructions which allow stopping the execution of the program or performing the return branching according to the duplicated value of the return address if the execution of the at least one function return additional instruction allows detecting that the value of the return address in the call stack is different from the duplicated value of the return address in the memory circuit.

The instructions for calling the at least one function further include at least one additional instruction configured to duplicate a value of a call stack pointer defined when the return address is added to the call stack. The return instructions of the at least one function include at least one additional instruction configured to compare the value of the call stack pointer defined upon recovery of the return address of the call stack to carry out the branching to the value of the call stack pointer duplicated in the memory circuit and to allow performing the branching only if these two values are identical.

The at least one additional instruction configured to duplicate a value of a call stack pointer is configured to store this value in a register of the memory circuit.

In an embodiment, the computer program product further includes instructions which allow stopping the execution of the program or performing the return branching according to the duplicated value of the return address if the execution of the at least one function return additional instruction allows detecting that the value of the stack pointer upon return is different from the duplicated value of the stack pointer.

According to another aspect, a method implemented by a computer—in particular by a computer system as described before—is provided, including an execution of a computer program product as described before.

According to another aspect, a method implemented by a computer is provided for generating a computer program, the method including generating instructions which, when the program is executed by a processor of a computer system, cause the latter to execute at least one function configured to receive data from outside the computer system, the instructions including instructions configured to carry out a call and a return of the at least one function, the instructions for calling the at least one function including an instruction configured to store a return address in a call stack, the return instructions of the at least one function including an instruction configured to carry out a branching from the return address stored in the call stack.

The method also includes adding at least one additional instruction for calling the at least one function, the at least one additional call instruction being configured to duplicate the return address in a memory circuit of the computer system for calling the at least one function.

The method further includes adding at least one function return additional instruction, the at least one function return additional instruction being configured to compare the value of the return address stored in the call stack to the value of the return address duplicated in the memory circuit of the computer system and to allow performing the branching only if these two values are identical.

The at least one additional instruction configured to duplicate the return address is configured to store the duplicated value of the return address in a register of the memory circuit.

In an implementation, the method further includes adding instructions which allow stopping the execution of the program or performing the return branching according to the duplicated value of the return address if the execution of the at least one function return additional instruction allows detecting that the value of the return address in the call stack is different from the duplicated value of the return address in the memory circuit.

The method further includes adding at least one additional instruction for calling the at least one function configured to duplicate a value of a call stack pointer defined when the return address is added to the call stack, and adding at least one additional instruction for calling the at least one function configured to compare the value of the call stack pointer defined upon recovery of the return address of the call stack to carry out the branching to the value of the call stack pointer duplicated in the memory circuit and to allow performing the branching only if these two values are identical.

The at least one additional instruction configured to duplicate a value of a call stack pointer is configured to store this value in a register of the memory circuit.

In an implementation, the method further includes adding instructions which allow stopping the execution of the program or performing the return branching according to the duplicated value of the return address if the execution of the at least one function return additional instruction allows detecting that the value of the stack pointer upon return is different from the duplicated value of the stack pointer.

According to another aspect, a computer program product includes instructions which, when the program is executed by a computer, cause the latter to implement a method for generating a computer program as described above.

BRIEF DESCRIPTION OF THE DRAWINGS

Other advantages and features will appear upon examining the detailed description of non-limiting embodiments and from the appended drawings, wherein.

DETAILED DESCRIPTION

Figure 1:
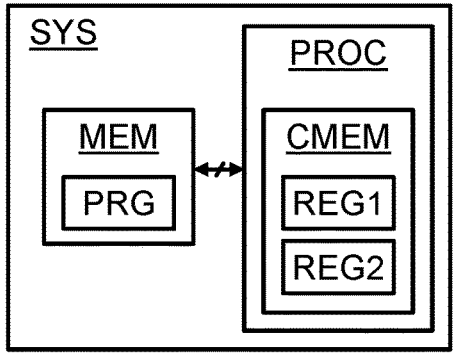
FIG. 1 is a block diagram of a computer system disclosed herein.

FIG. 1 illustrates an embodiment of a computer system SYS. For example, the computer system SYS may be a microcontroller.

The computer system SYS comprises a processor PROC and a memory MEM. The memory MEM allows storing a computer program PRG. The computer program PRG comprises instructions which can be executed by the processor PROC of the computer system SYS.

When the processor PROC executes the computer program PRG, the processor PROC uses an instruction pointer ("instruction pointer" or "program counter"). This instruction pointer is a register which contains the memory address of the instructions being executed or to be executed soon according to the architecture of the processor. This instruction pointer is incremented as soon as an instruction is loaded in the processor so as to point on the memory address of the next instruction.

The computer program PRG comprises several functions. In order to be able to execute these functions, the program PRG comprises instructions allowing carrying out a function call as well as instructions allowing carrying out a function return.

The execution of the function of the computer program PRG uses a call stack. In particular, the call stack is carried out in a portion of a random-access memory of the computer system SYS. The call stack is used to store a return address, arguments/parameters, local variables required for executing said function.

The computer system SYS includes a stack pointer. The stack pointer is a register which is used to store the uppermost address of the call stack.

The instructions allowing carrying out a function call comprise a branching instruction whose destination address is that of the first instruction of the function. Thus, when a function is called, the value of the instruction pointer is modified so as to point on the memory address of the first instruction of said function.

The instructions allowing carrying out a function call comprise at least one "push" type instruction. This instruction allows adding the value of a register in the call stack. In particular, the instruction allowing carrying out a function call comprise a "push {LR}" type instruction allowing adding in the call stack the content of a link register LR ("link register"). The content of the register LR corresponds to a return address to execute the continuation of the program once said function is executed. This "push {LR}" instruction is configured to be executed at the beginning of a function call.

The instructions allowing carrying out a function return comprise at least one instruction allowing restoring a context of the function. The context is a space of the call stack allowing storing for example parameter, a result of the function, the return address and local variables.

The instructions allowing carrying out a function return also comprise at least one "POP" type instruction. This instruction allows retrieving a value of a register of the call stack. In particular, the instructions allowing carrying out a function call comprise a "pop {pc}" type instruction allowing recovering the value of the register LR stored in the stack and corresponding to the return address to put it in the instruction pointer.

The program PRG also comprises additional instructions for carrying out the calls of some functions. These additional instructions serve in protecting these functions against stack overflow type attacks ("stack overflow") in particular "ROP" attacks "Return-Oriented Programming".

These additional instructions are used for the functions configured to receive data originating from outside the computer system, in particular from the microcontroller, such as data obtained via a "UART" communication, a Wi-Fi communication, or originating from a sensor, etc. The "ROP" type attacks are initialized upon execution of such functions, by adding to the call stack data received from the outside so as to cause a stack overflow.

Hence, the additional instructions are integrated only to execute this type of functions. This allows increasing an execution time of the program only when such a function is called. The execution of the other functions of the program does not use these additional instructions.

In particular, the additional instructions are executed upon calls and returns of the functions configured to receive data originating from the outside.

More particularly, the instructions allowing carrying out a function call comprise at least one additional instruction allowing duplicating the return address in a memory circuit CMEM of the computer system SYS.

The instructions allowing carrying out a function call also comprise at least one additional instruction allowing duplicating in the memory circuit CMEM of the computer system SYS the value of the stack pointer upon addition of the return address in the stack.

The memory circuit CMEM may comprise two registers REG1, REG2 of the computer system SYS. A first register REG1 is then used to store the duplicated value of the return address defined upon calling the function. A second register REG2 is used to store the duplicated value of the stack pointer. This second register REG2 is optional. The registers REG1, REG2 may be registers of the processor PROC. These registers may be additional registers of the processor or initial registers of the processor PROC. Hence, the function of these initial registers is modified to dedicate them to storage of the duplicate value of the return address and of the duplicated value of the stack pointer. For example, in the case where the processor PROC has an ARM® architecture, it is possible to use the registers R4 and R5. It is also possible to use the register R9 if no position-independent code ("position-independent code") is used. It is also possible to use floating-point registers (S0 to S31 for an ARM® architecture) if the floating point is not used.

Alternatively, the registers may be registers of a dedicated secure circuit of the computer system (for example having a "TrustZone" type architecture on ARM®).

Furthermore, a dedicated circuit may also be configured to store several stack pointer duplicated values and several return address duplicated values, each duplicated value of the stack pointer being associated with one single return address duplicated value.

Alternatively, the memory circuit CMEM comprises a portion of the random-access memory. This portion of the random-access memory is then used to store the duplicated value of the stack pointer and the duplicated value of the return address defined upon function call.

The memory circuit CMEM is configured to receive data only from the register LR or from the register of the stack pointer. Hence, the values stored in the memory circuit CMEM can hardly be modified by an attacker.

The instructions allowing carrying out a function return comprise additional instructions allowing comparing the value of the stack pointer upon recovery of the return address with the duplicated value of the stack pointer stored in the memory circuit CMEM.

This comparison allows verifying that the value of the stack pointer has not been modified upon execution of said function. This comparison may be carried out by the processor or by a dedicated circuit.

The instructions allowing carrying out a function return comprise additional instructions allowing comparing the value of the return address of the register LR with the duplicated value of the return address stored in the memory circuit CMEM.

This comparison allows verifying that the value of the return address of the register LR has not been modified upon execution of said function.

If the value of the stack pointer upon recovery of the return address corresponds to the duplicated value of the stack pointer and if the value of the return address of the register LR corresponds to the duplicated value of the return address, then this means that the value of the return address in the call stack has not been modified. In this case, the program PRG is configured to continue being executed by carrying out the function return branching.

If the value of the stack pointer upon recovery of the return address is different from the duplicated value of the stack pointer and/or if the value of the return address of the register LR is different from the duplicated value of the return address, this means that the call stack has been undesirably modified. This modification may be the result of a "ROP" type attack or because an attacker has succeeded in shifting the stack pointer towards a memory area (also referred to by the expression "fake stack") controlled by the attacker. Thus, in this case, instructions of the program PRG are configured to be executed so as to undertake countermeasures. For example, when they are executed, these instructions may allow either stopping the execution of the program PRG or replacing the value of the return address by the duplicated value of the return address so as to return to the desired return address upon branching the return of the function. These instructions may also generate an alert signal allowing informing the user of the computer system that the call stack has been modified and that the computer system is potentially undergoing a "ROP" type attack. Hence, such a computer system SYS is configured to simply detect "ROP" stack overflow type attacks. In particular, such a computer system SYS has a simple architecture allowing storing the duplicated values of the stack pointer and of the return address. For example, the computer system SYS uses a memory circuit CMEM comprising just two registers to store the duplicated values of the stack pointer and of the memory address. Alternatively, the use of a dedicated circuit as a memory circuit CMEM allows performing the control of the values of the stack pointer and of the return address in parallel with the execution of the computer program PRG.

Figure 2:
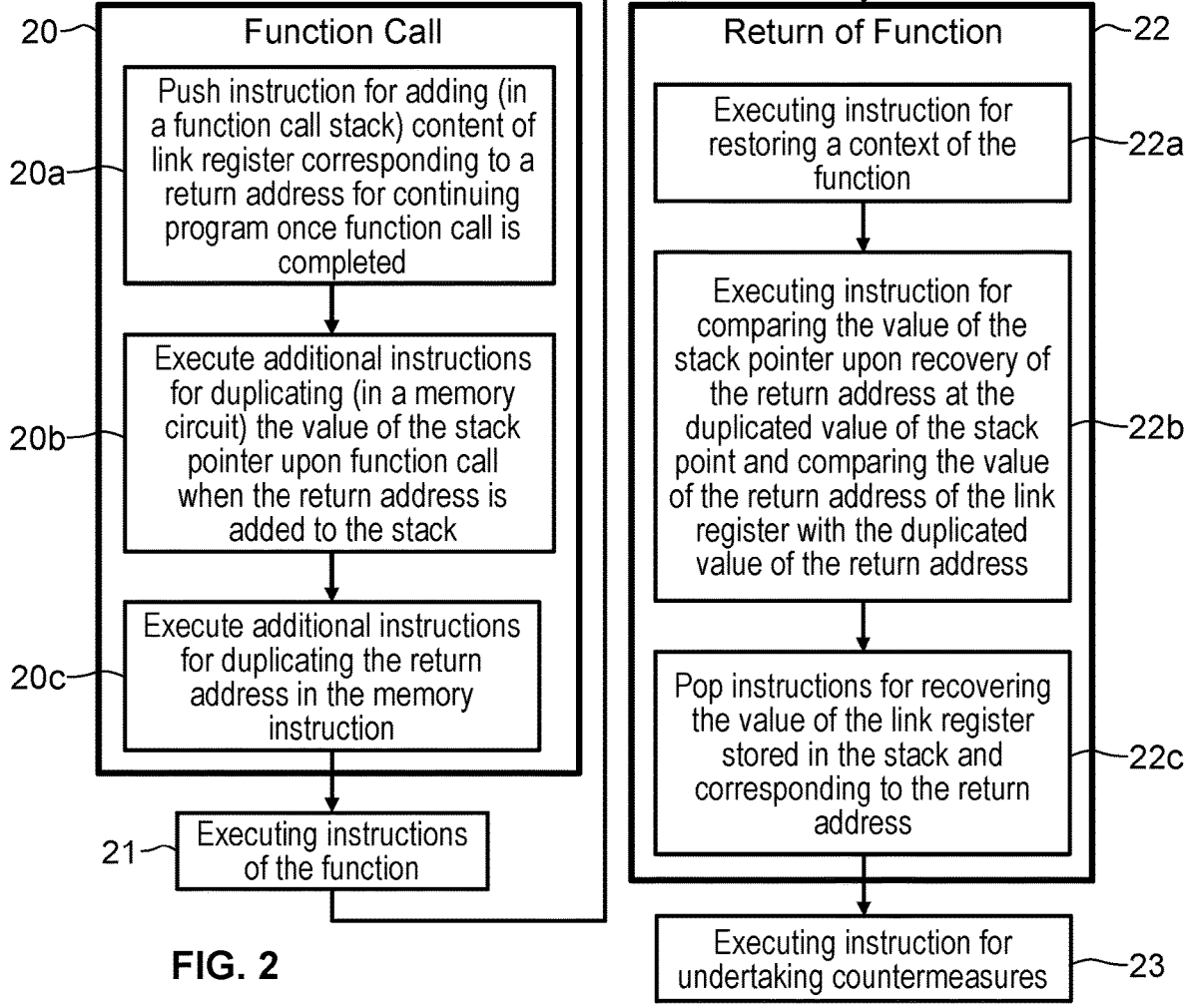
FIG. 2 is a flowchart of a method for executing a program disclosed herein.

FIG. 2 illustrates a method for executing a program PRG as described before.

The method comprises calling 20 at least one function configured to receive data originating from outside the computer system SYS executing the program PRG.

The call 20 of such a function comprises executing 20a a "push {LR}" type instruction allowing adding in a function call stack the content of a link register LR ("link register") which corresponds to a return address for executing the continuation of the program once said function is executed.

In particular, the call 20 also comprises executing 20b additional instructions allowing duplicating in a memory circuit of the computer system the value of the stack pointer upon function call when the return address is added to the stack. The call 20 also comprises executing 20c additional instructions allowing duplicating the return address in the memory circuit of the computer system.

Afterwards, the method comprises executing 21 instructions of the function.

Afterwards, the method comprises a return 22 of the function.

The return 22 of the function comprises executing 22a at least one instruction allowing restoring a context of the function. The context is a space of the call stack allowing storing for example parameter, a result of the function, the return address and local variables.

The return 22 of the function also comprises executing 22b instructions allowing comparing the value of the stack pointer upon recovery of the return address at the duplicated value of the stack pointer and comparing the value of the return address of the register LR with the duplicated value of the return address.

If the value of the stack pointer upon recovery of the return address corresponds to the duplicated value of the stack pointer and if the value of the return address of the register LR corresponds to the duplicated value of the return address, then the return of the function comprises executing 22c a "pop {pc}" instruction allowing recovering the value of the register LR stored in the stack and corresponding to the return address to put it in the instruction pointer so as to quit the function and execute the continuation of the program.

If the value of the stack pointer upon recovery of the return address is different from the duplicated value of the stack pointer and/or if the value of the return address of the register LR is different from the duplicated value of the return address, then the method comprises executing 23 instructions configured to be executed so as to undertake countermeasures, described before.

Figure 3:
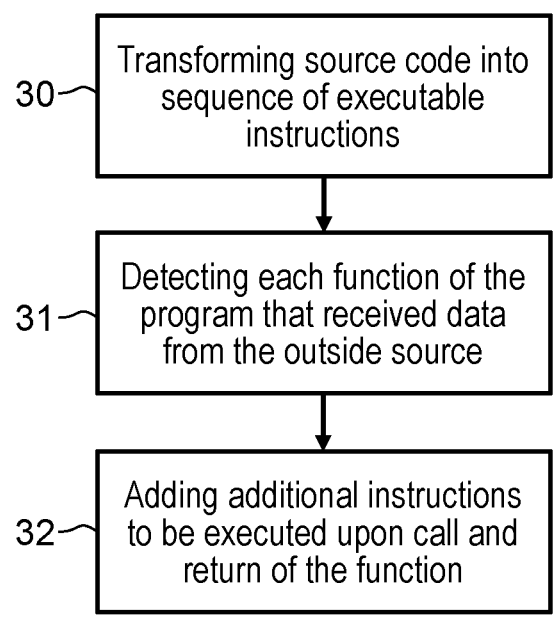
FIG. 3 is a flowchart of a computer-implemented method for generating a computer program disclosed herein.

FIG. 3 illustrates a computer-implemented method for generating a computer program PRG as described before. In particular, a compiler computer program may comprise instructions which, when executed by a computer, cause the latter to implement such a method for generating a computer program PRG.

Such a method may be implemented upon compilation of a source code so as to obtain said program. The source code allows defining the different functions of the program. At least one function of the program defined in the source code is configured to receive data originating from outside the computer system intended to execute the program.

The source code is configured to signal each function of the program adapted to receive data originating from the outside.

In particular, to identify such a function, the source code may include a tag placed at the beginning of such a function. This tag may be inserted by the person having written the source code. A tag may consist of a character string.

The method for generating the computer program comprises transforming 30 by a compiler the source code into a sequence of instructions executable by the computer system. Hence, this instruction sequence is generated by the compiler from the source code.

In particular, the method for generating the computer program PRG comprises detecting 31, by the compiler, each function of the program configured to receive data originating from the outside. This detection may be carried out by detecting the tag in the source code that identifies such a function.

Afterwards, for each detected function configured to receive data originating from the outside, the method comprises adding 32, by the compiler, additional instructions to be executed upon call and return of said function. Hence, these additional instructions can be added only for the functions identified by said tag in the source code. Hence, these additional instructions are generated without any intervention of a developer.

As set out before, these additional instructions will serve in protecting these functions against stack overflow type attacks ("stack overflow"), in particular "ROP" attacks "Return-Oriented Programming".

In particular, the additional instructions added for calling the function allow duplicating, in a memory circuit of the computer system intended to execute the program, the return address in this memory circuit of the computer system. These additional instructions also allow duplicating in this memory circuit of the computer system the value of the stack pointer upon addition of the return address in the stack.

The additional instructions added for the function return comprise additional instructions allowing comparing the value of the return address of the register LR at the duplicated value of the return address stored in the memory circuit CMEM. This comparison allows verifying that the value of the return address of the register LR has not been modified upon execution of said function. As set out before, these additional instructions also comprise instructions allowing undertaking countermeasures if the value of the stack pointer upon recovery of the return address is different from the duplicated value of the stack pointer and/or if the value of the return address of the register LR is different from the duplicated value of the return address.

The invention claimed is:

1. A computer system, comprising:
   a memory configured to store a computer program product;
   a processor configured to execute said computer program product;
   a memory circuit;
   said computer program product comprising instructions which, when executed by said processor, cause said processor to execute at least one function configured to receive data from outside the computer system;
   said instructions comprising instructions configuring the processor to carry out a call and a return of said at least one function;
   the instructions configuring the processor to carry out the call of said at least one function including an instruction to store a return address in a call stack, and at least one first additional instruction to duplicate said return address in said memory circuit;
   the instructions configuring the processor to carry out the return of said at least one function including an instruction to carry out a branching from the return address stored in the call stack, and at least one second additional instruction to compare a value of the return address stored in the call stack to a value of the return address duplicated in said memory circuit and to permit the branching when the value of the return address stored in the call stack and the value of the return address duplicated in said memory circuit are identical;
   the instructions configuring the processor to carry out the call of said at least one function further comprising at least one third additional instruction to duplicate a value of a call stack pointer defined when the return address is added to the call stack; and
   the instructions configuring the processor to carry out the return of said at least one function including at least one additional fourth instruction to compare the value of the call stack pointer defined upon addition of the return address to the call stack to the value of the call stack pointer duplicated in said memory circuit and to permit said branching only if the value of the call stack pointer defined upon addition of the return address to the call stack and the value of the call stack pointer duplicated in said memory circuit are identical.

2. The computer system according to claim 1, wherein the memory circuit comprises a register configured to store the value of the return address duplicated in said memory circuit.

3. The computer system according to claim 1, wherein the computer program product comprises instructions which stop the execution of the computer program product or perform the branching according to the value of the return address duplicated in said memory circuit if the execution of said at least one second additional instruction detects that the value of the return address in the call stack is different from the value of the return address duplicated in said memory circuit.

4. The computer system according to claim 1, wherein the memory circuit comprises a register configured to store the value of the call stack pointer.

5. The computer system according to claim 1, wherein the computer program product comprises instructions which allow stopping the execution of the computer program product or performing the branching according to the value of the return address duplicated in said memory circuit if the execution of said at least one additional fourth instruction indicates that the value of the call stack pointer defined upon addition of the return address to the call stack and the value of the call stack pointer duplicated in said memory circuit are different.

6. A computer implemented method, comprising:
generating instructions which execute at least one function to receive external data, said instructions comprising instructions to carry out a call and a return of said at least one function, the instructions to carry out a call of said at least one function including an instruction to store a return address in a call stack, the instructions to carry out a return of said at least one function including an instruction to carry out a branching from the return address stored in the call stack;
performing at least one first additional instruction for calling said at least one function, said at least one first additional instruction to duplicate said return address in a memory circuit for calling said at least one function;
performing at least one second additional instruction to compare a value of the return address stored in the call stack to a value of the return address duplicated in said memory circuit and to permit said branching only if the value of the return address stored in the call stack and the value of the return address duplicated in said memory circuit are equal;
performing at least one third additional instruction for calling said at least one function to duplicate a value of a call stack pointer defined when the return address is added to the call stack; and
performing at least one fourth additional instruction to call said at least one function to compare the value of the call stack pointer defined upon addition of the return address to the call stack to the value of the call stack pointer duplicated in said memory circuit and to permit said branching only if the value of the call stack pointer defined upon addition of the return address to the call stack and the value of the call stack pointer duplicated in said memory circuit are identical.

7. The computer implemented method according to claim 6, wherein said at least one first additional instruction to duplicate said return address stores the duplicated value of the return address in a register of said memory circuit.

8. The computer implemented method according to claim 6, further comprising performing instructions to stop the method or performing the branching according to the duplicated value of the return address if the execution of said at least one second additional instruction detects that the value of the return address in the call stack is different from the duplicated value of the return address in the memory circuit.

9. The computer implemented method according to claim 6, wherein said at least one first additional instruction configured to duplicate a value of a call stack pointer is configured to store this value in a register of the memory circuit.

10. The computer implemented method according to claim 9, further comprising adding instructions to stop the method or performing the branching according to the duplicated value of the return address if the performance of the at least one fourth additional instruction indicates that the value of the call stack pointer defined upon addition of the return address to the call stack and the value of the call stack pointer duplicated in said memory circuit are different.

11. A computer system, comprising:
a processor;
a memory configured to store a computer program containing instructions executable by the processor;
an instruction pointer register configured to hold a memory address of instructions being executed by the processor; and
a stack pointer register configured to store an address of a call stack within the memory;
wherein the computer program includes instructions for performing a function call and instructions for performing a function return,
wherein the function call instructions include a branching instruction to initiate execution of a push instruction to add a return address to the call stack,
wherein the function return instructions include at least one instruction for restoring a function context and a pop instruction for recovering a return address from the call stack,
wherein the computer program further comprises additional instructions for protecting against stack overflow attacks, and
wherein the additional instructions are executed upon calls and returns of functions configured to receive data from external sources, and include at least one instruction for duplicating a return address and a stack pointer value in a memory circuit within the computer system.

12. The computer system of claim 11, wherein the memory circuit comprises at least two registers for storing the duplicated return address and stack pointer value, and wherein the memory circuit is configured to receive data only from a link register or the stack pointer register.

13. The computer system of claim 12, wherein the function return instructions further include instructions for comparing the stack pointer value upon recovery of the return address with the duplicated stack pointer value, and for comparing the return address with the duplicated return address, wherein the computer program is configured to continue execution if the return address and the duplicated return address are equal but to otherwise execute countermeasures.

* * * * *